L. B. ROGERS.
TRAP.
APPLICATION FILED JAN. 10, 1914.
1,105,458.
Patented July 28, 1914.
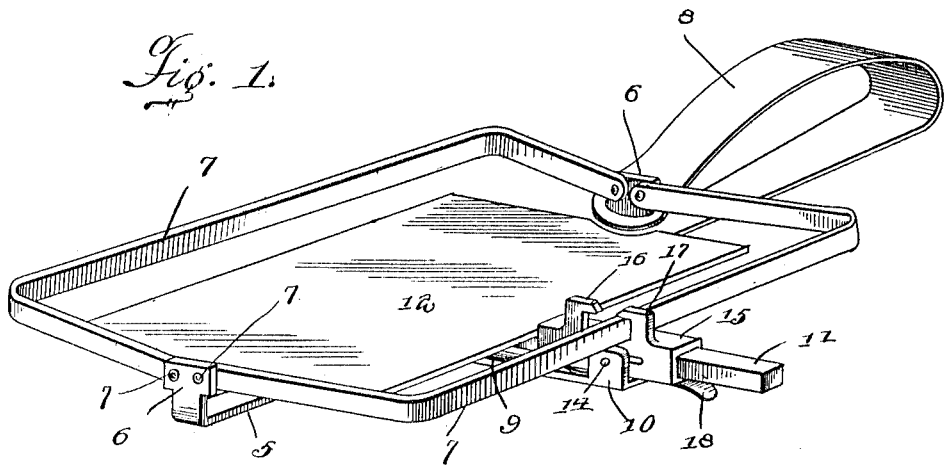
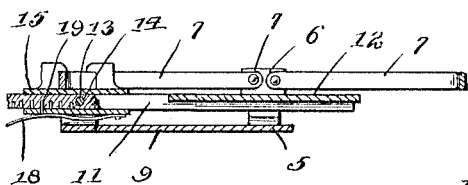
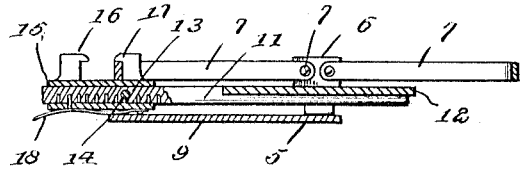
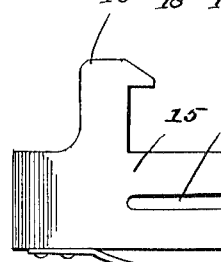
Inventor
Lonzo B. Rogers.
Witnesses
Frederick L. Fox
Edw. Yeager
By Victor J. Evans.
Attorney

UNITED STATES PATENT OFFICE.

LONZO B. ROGERS, OF BRINKLEY, ARKANSAS.

TRAP.

1,105,458.  Specification of Letters Patent.  Patented July 28, 1914.

Application filed January 10, 1914. Serial No. 811,483.

*To all whom it may concern:*

Be it known that I, LONZO B. ROGERS, a citizen of the United States, residing at Brinkley, in the county of Monroe and State of Arkansas, have invented new and useful Improvements in Traps, of which the following is a specification.

This invention relates to improvements in traps, and has particular reference to this class of devices known as jaw traps.

The general object of the invention is the provision of a trap of the above mentioned character which may be quickly and easily set in either of two ways so as to reverse the operation of the trap, whereby to permit of its use to catch the ordinary animal which traverses the ground and steps into the trap, or set so that it will operate to catch animals which attempt to grab the bait and fly.

Another object of the invention is the provision of a trap constructed to operate for the above mentioned purposes and provided with means for automatically locking the trap in either of its set positions, as the occasion may demand.

With these and other objects in view which will appear as the nature of the invention is better understood, the invention consists in the specific construction, combination and arrangement of parts which will hereinafter be more fully described and particularly pointed out in the appended claims.

In the drawing forming a part of this application and in which like numerals of reference indicate similar parts in the several views: Figure 1 is a perspective view of my improved trap. Fig. 2 is a transverse sectional view showing the trap in one of its set positions. Fig. 3 is a similar view showing the trap in the other of its set positions. Fig. 4 is a detail view of the locking member.

Referring to the drawing by numerals 5 designates the base support, from adjacent the opposite ends of which rise the posts 6 provided with alined openings 7 in which are pivotally mounted the jaws 7 of the ordinary and well known construction. I employ a spring 8 of substantially U-form which has its free ends apertured to surround one of the posts 6, and exerts an upward tension on the jaws 7 to forcibly move the latter to closed position when released in the manner which will hereinafter be described.

Projecting laterally from the base support 5 is a member 9 which is formed at its free end with upturned apertured ears 10 disposed at the opposite sides of the member, and between which is pivotally mounted the bar 11 of the bait support or platform 12. The bar 11 projects at a right angle from the medial portion of the platform 12, and as shown in one embodiment of the invention is of rectangular formation and provided with an opening 13 for the reception of the pivot pin 14 which passes through the ears 10 for pivotally supporting the platform 12.

Mounted for sliding movement on the bar 11 is a duplex locking member 15 which is rectangular in cross section to correspond to the contour of the bar 11, but while I have shown the bar 11 and the locking member 15 of rectangular formation, it is to be understood that this is merely illustrative, and that these members may be made in any form as may be desired, or the occasion may demand.

Rising from one side of the locking member 15 and preferably formed integral therewith are spaced catch hooks 16 and 17 opening toward each other, and one or the other of which being adapted to engage one of the jaws 7 to retain the latter normally in open or set position, the particular hook used in setting the trap of course depending on what species of animal is desired to be caught.

Secured in any suitable manner to the underside of the sliding member 15 is one end of a spring 18 and from a point adjacent the opposite end thereof rises a pin 19 which extends through an opening in the bottom of the member 15 and through an opening in the bottom of the bar 11 to prevent casual displacement of the member 15 when the trap is set. The bottom of the bar 11 is provided with a plurality of spaced openings any one of which may receive the pin 19 whereby the locking member 15 may be held in any desired position on the bar so as to increase or decrease the sensitiveness of the trap as occasion may demand. The member 15 is provided with a longitudinal slot 20 through which the pivot pin 14 is passed, and by means of which slot the member 15 is permitted a sliding movement whereby either of the catch hooks 16 or 17 may be moved into engagement with one of the jaws 7.

In assembling the parts, the locking member 15 is slipped upon the bar 11 after which the whole is pivoted in the hereinabove described manner between the ears 10. The platform 12 as will be noted fills the entire space between the jaws making it impossible for anything to step in the trap without operating the same.

The operation of the device is as follows: When the trap is to be used in the ordinary manner to catch animals which traverse the ground, the jaws are first moved to open position, after which the locking member 15 is moved upon the bar 11 until the catch hook 16 engages over one of the jaws 7. The trap is then ready or set for animals which step into the trap depressing the platform 12 and consequently elevating the free end of the bar 11 until the catch hook 16 releases the jaw at which time the spring 8 forcibly moves the said jaws to closed position. When it is desired to use the trap to catch animals which attempt to grab the bait and fly away, the locking member 15 is moved forwardly on the bar 11 until the catch hook 17 engages the jaw 7. With the trap thus set, the animal in attempting to grab the bait and fly raises the platform 12 thus moving the free end of the bar 11 downwardly until the said catch hook 17 releases the jaw, when the said jaws will again be operated by means of the spring 8. The pin 19 as hereinabove described engages in suitable openings in the bottom of the member 15 and the bar 11 whereby the former may be properly held in either of its set positions. As will be noted the free end of the spring 18 is curved downwardly and projects beyond one end of the trip member 17 to provide a manipulating portion to facilitate the removal of the pin from the opening when it is desired to adjust the locking member 15.

The bait (not shown) may be secured to the platform 12 in any suitable manner.

From the foregoing description considered in connection with the accompanying drawing, it will be manifest that I have provided a trap of simple construction, which may be quickly and easily set in either of two ways to permit of its use for catching different species of animals, and while I have shown and described the preferred form of my invention, it is to be understood that I am not to be limited to the precise construction and arrangement herein illustrated, as various changes may be made within the scope of the appended claims.

What I claim is:

1. In a trap of the class described, a pair of swinging jaws, means for closing said jaws, a movable bait support, and means slidably adjustable thereon for locking engagement with one of the jaws for permitting the release of said jaws on a prescribed movement of the support.

2. In a trap of the class described, a pair of spring operated jaws, a movable bait supporting member having an angularly disposed bar, a duplex locking member mounted on said bar, a spring secured to the bottom of said locking member, and a pin carried by the spring to connect said member and bar to retain the former in adjusted position.

3. A trap comprising a base, a pair of spring operated jaws mounted thereon, a member extending laterally from said base and provided with upstanding ears, a bait support pivoted between said ears, and a duplex locking member adjustable thereon for alternately engaging one of said jaws to permit the release of said jaws on a prescribed movement of said support.

4. In a trap of the class described, a pair of spring operated jaws, a movable bait support, a locking member adjustable on said support and including a pair of spaced vertically disposed catch hooks opening toward each other and adapted to alternately engage one of said jaws to permit said jaws to be moved to closed position on a prescribed movement of said support, and means for holding said locking member in adjusted position.

5. In a trap of the class described, a pair of swinging jaws, means for closing said jaws, a movable bait support, and means slidable on said support for interchangeable locking engagement with one of the jaws for permitting the release of said jaws on a prescribed movement of the support.

6. In a trap of the class described, a pair of swinging jaws, means for closing said jaws, and means slidably adjustable on said support for alternately engaging one of said jaws for permitting the release of said jaws on a prescribed movement of the support.

7. In a trap of the class described, a pair of swinging jaws, means for closing said jaws, a movable bait support, and a duplex locking element slidable on the support for engagement with one of the jaws for permitting the release of said jaws on a prescribed movement of the support.

8. In a trap of the class described, a pair of spring operated jaws, a movable bait support, a duplex locking member slidably adjustable on the support for alternately engaging one of said jaws to permit the release of said jaws on a prescribed movement of said support.

9. In a trap of the class described, a pair of spring operated jaws, a movable bait support, a duplex locking member slidably adjustable thereon for alternate engagement with one of said jaws, and means for locking said member in adjusted position.

10. In a trap of the class described, a pair of swinging jaws, means for closing said jaws, a movable bait support, a duplex locking member slidably adjustable thereon for alternately engaging one of said jaws, and means for automatically locking said member in adjusted position.

In testimony whereof I affix my signature in presence of two witnesses.

LONZO B. ROGERS.

Witnesses:
JNO. I. JACKSON,
E. T. MCCREIGHT.

Copies of this patent may be obtained for five cents each, by addressing the "Commissioner of Patents, Washington, D. C."